March 16, 1937. C. J. SURDY 2,074,302
STOKER MECHANISM
Filed Nov. 15, 1934 2 Sheets—Sheet 2
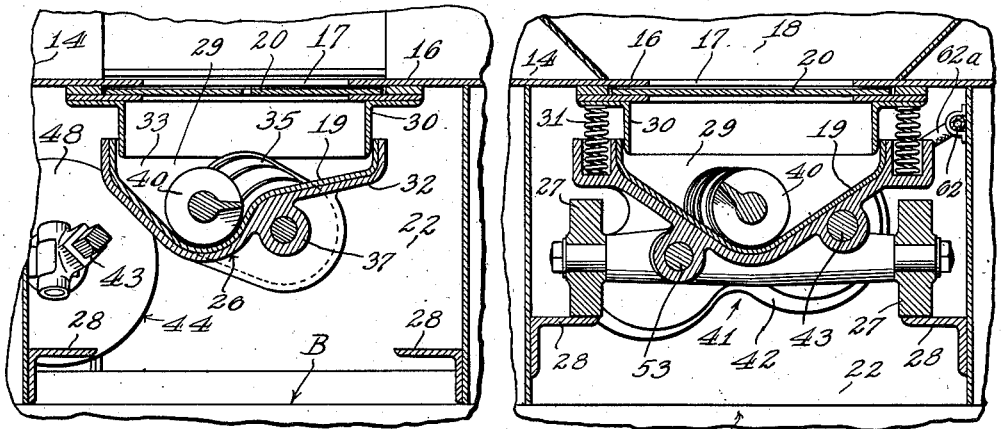
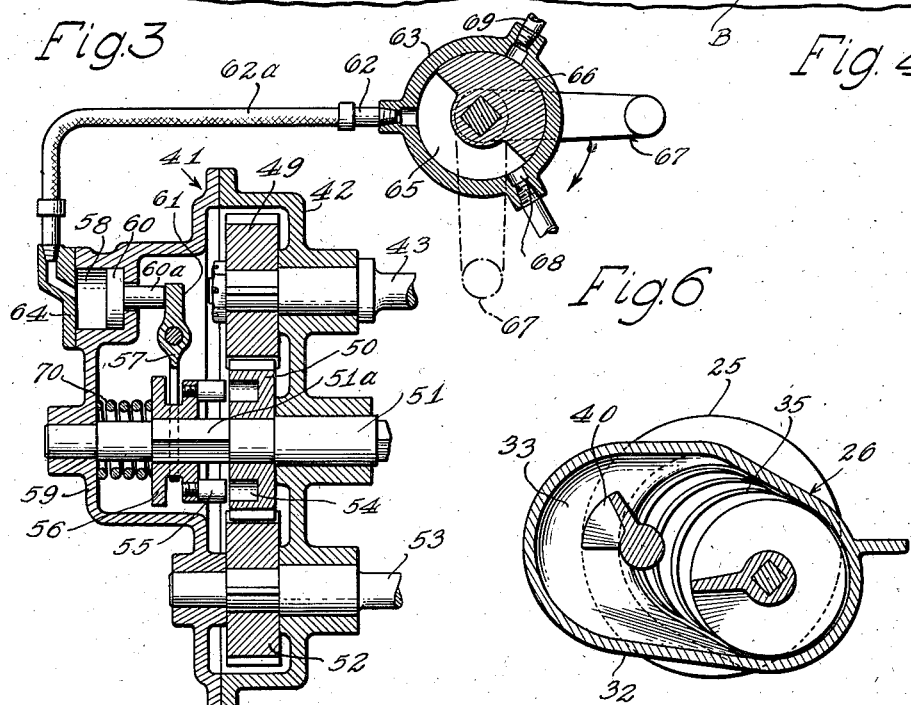
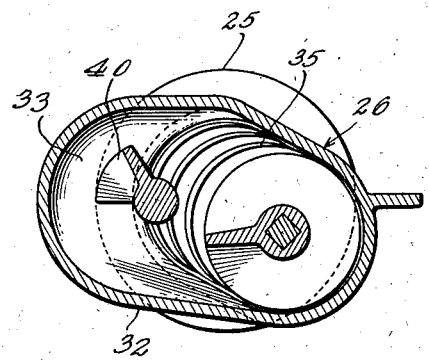
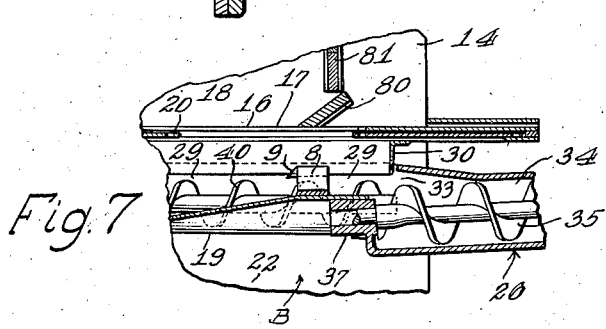
INVENTOR
Charles J. Surdy
BY
ATTORNEY Patented Mar. 16, 1937

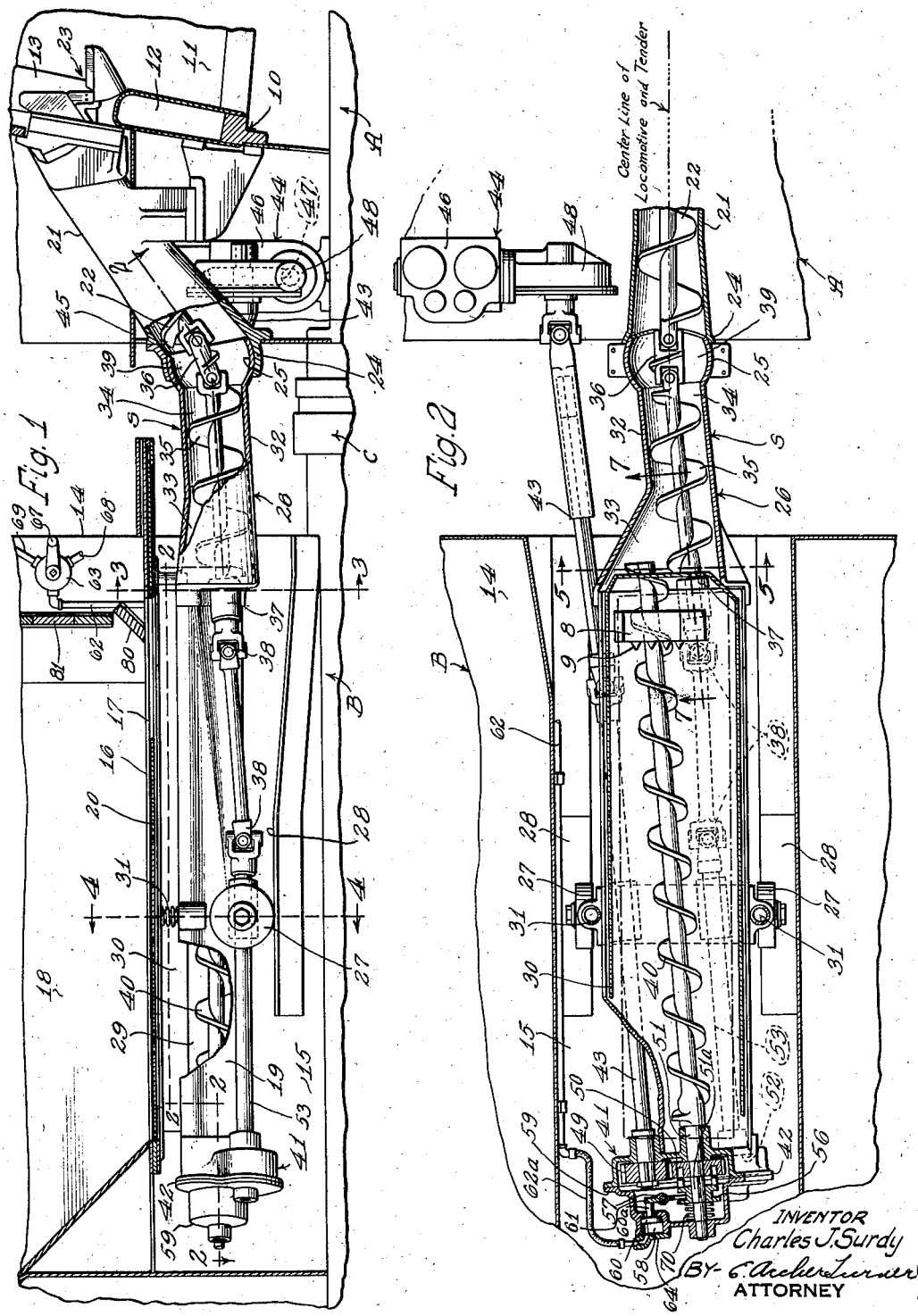

2,074,302

UNITED STATES PATENT OFFICE 2,074,302

STOKER MECHANISM

Charles J. Surdy, Tuckahoe, N. Y., assignor, by mesne assignments, to The Standard Stoker Company, Inc., New York, N. Y., a corporation of Delaware Application November 15, 1934, Serial No. 753,089

12 Claims. (Cl. 198—15)

This invention, relating to stoker mechanism especially adaptable for firing locomotives, has for its main object the provision of an improved stoker comprising a pair of flexibly connected conduits, one of which is arranged to be movably mounted on the tender and includes a pair of conveyor screws, the forward end of one conveyor screw being offset from the rearward end of the other and delivering fuel thereto.

A further object of this invention resides in the provision of the above described stoker mechanism wherein the conveyor screws in the movably mounted conduit are each provided with separate drive connections leading from a common gear train.

Another object of this invention is to provide, in a stoker having a conduit with a conveyor screw therein driven by a gear train carried by the conduit which is movably mounted as a unit on the tender, a pressure fluid operated means for disconnecting the conveyor screw from its operative relation with the gear train.

A further object is to provide a new arrangement of parts whereby manual introduction of fuel into the stoker forward of the trough portion is greatly simplified.

A still further object resides in the provision of a stoker having the above described attributes and in which the connected conduits thereof are disposed substantially centrally of the vertical medial plane of the locomotive and tender, but wherein the conveyor screw in the trough portion is arranged with the forward end thereof disposed at one side of the vertical medial plane of the locomotive and tender and laterally offset from the rearward end of the conveyor screw within the tubular extension.

It is also an object to so arrange the conveyor screw in the trough portion so that its axis extends obliquely of the vertical medial plane of the locomotive and tender and also at one side of the axis of the conveyor screw in the tubular extension.

Further objects and advantages of my invention will be apparent as the description thereof proceeds. In the drawings which accompany the following description of my invention, Figure 1 is a vertical medial section taken through adjacent portions of the locomotive and tender with my invention in position thereon, portions of which have been broken away;

Figure 2 is a plan section taken on the irregular line 2—2 of Figure 1;

Figures 3 and 4 are sectional views taken on the lines 3—3 and 4—4, respectively, of Figure 1;

Figure 5 is a sectional view taken on the line 5—5 of Figure 2;

Figure 6 is an enlarged sectional view of the gear case at the rear of the trough portion, with the control mechanism of a pressure fluid clutch operating device shown diagrammatically; and Figure 7 is a sectional view taken on the line 7—7 of Figure 2.

On these drawings A is the locomotive, B its tender and C the articulated coupling therebetween. The locomotive A includes the boiler 10, a firebox 11 provided with a backwall 12 having therein the usual firing opening 13. At 14 is indicated the tank of the tender having a compartment 15 centrally disposed therein below the floor 16, which floor is provided with a central aperture 17. Above the floor 16 is a fuel bin 18 and the fuel therein falls by gravity into a stoker trough 19 through an adjustable opening in the apertured floor which is controlled by the slidable plates 20.

The stoker is indicated generally at S and includes an inclined conduit 21 rigidly mounted on the locomotive with its axis substantially on the vertical medial plane of the locomotive and tender. The inclined conduit 21 at its upper end communicates with the firing opening 13 and houses the elevating screw 22 which urges fuel therethrough to the distributing means 23 for distribution to all parts of the firebed. At its lower rearward end, the inclined conduit 21 is provided with a spherical seat 24 in which is received the spherical shell 25 of a second conduit 26 leading forwardly from beneath the fuel bin of the tender.

The second named conduit 26 is flexibly mounted within the compartment 15 by means of the roller 27 carried by the conduit and resting upon the parallel tracks 28. Since the particular mounting of the conduit 26 is the same as that used with the well known "Duplex" locomotive stoker, a further description is deemed unnecessary. The trough 19 forms an integral part of the conduit 26 and it has an upwardly opening mouth 29 beneath the aperture 17 of the floor 16. A sealing ring 30 supported from the conduit 26 by springs 31 maintains a slidable closure between the underside of the apertured floor 16 and the open mouth 29 of the trough 19 and thereby prevents loss of fuel which would otherwise occur during lateral movement of the conduit beneath the apertured floor. This construction is also substantially the same as that used in the "Duplex" locomotive stoker.

To the forward end of the trough 19 is rigidly connected a tubular extension 32, carrying the spherical shell 25 at its forward end and the laterally flared mouth 33 at its rearward end which forms a transitional section between the comparatively wide trough 19 and the tubular section 34 of the extension 32. Within the tubular extension 32 is a conveyor screw 35, universally connected at its forward end by a link 36 to the lower rearward end of the elevating screw 22; at its rearward end the screw 35 is journalled in a bearing 37 which is formed with the tubular extension 32. The trough 19 at this point is suitably shaped so that the bearing 37 and the drive connections 38 for the screw 35 have sufficient clearance with the under side of the trough in operation of the device.

It will be observed from an inspection of Figures 1 and 2 that the universal connection between the screws 22 and 35 is within the ball and socket arrangement 39 formed by the spherical seat 24 of the inclined conduit 21 and the spherical shell 25 of the conduit 26. The operating angle of the universal connection between the screws 22 and 35, while not excessive, is a substantial one, and in order that this angle may not be increased, I maintain the axis of the screw 35 very nearly in coincidence with the vertical plane passed through the axis of the elevating screw 22. The slight lateral angle which the screw 35 makes is compensated for by forwardly inclining the screw 35. Stoker designers will readily understand that this is a preferred construction.

A substantially horizontally disposed conveyor screw 40 is mounted within the trough 19 and it is so arranged that its forward end terminates adjacent to but separate and offset from the rearward end of the screw 35 in the tubular extension 32. Preferably, the axis of this screw extends obliquely of the vertical medial plane of the locomotive and tender, or it may be otherwise arranged so that its forward end maintains the desired lateral offset relation with the rearward end of the screw 35.

By the described arrangement of parts, it is possible to attain an independent drive for each of the screws 40 and 35 with its connected screw 22, so that when the operation of the screw 40 is interrupted, the screws 35, 22 may continue to deliver fuel into the firebox. The driving means for the screws 40, 35 and 22 includes a gear train 41 housed in the gear casing 42 at the rear of the conveyor screw 40. Power is transmitted to this gear train by means of a telescopic shaft 43 leading rearwardly from a driving unit 44 which may be mounted on the locomotive beneath the cab deck 45. The drive unit 44 includes a prime mover 46 operating reduction gearing 47 within a gear case 48, to which reduction gearing 47 the telescopic shaft 43 is connected.

The gear train 41 comprises a gear 49 driven by the telescopic shaft 43 and meshing with a gear 50 loosely mounted upon a shaft 51 which is operatively connected to the conveyor screw 40. Another gear 52 meshes with the gear 50 and transmits power to a shaft 53 extending along the under side of the trough 19 and having the universal joints 38 with the screw 35, forming a drive connection therefor. The loosely mounted gear 50 is provided with recesses 54 which are engageable by the pins 55 carried by a clutch member 56. This clutch member is operatively mounted on the polygonal portion 51a of the shaft 51 and is slidable therealong by a pivoted yoke 57 into a position whereby the pins 55 will engage the recesses 54 so that the gear 50 will then drive the shaft 51 and its connected conveyor screw 40.

Since the conduit 26 is movable underneath the fuel bin, the use of links and levers for operating the yoke 57 of the clutch member 56 is not very practical. I provide a simple and efficient pressure fluid means for operating the yoke of the clutch member 56 and this means includes a cylinder 58 carried by the movable conduit 26 and preferably formed in the cover 59 which constitutes a portion of the gear casing 42. Within the cylinder 58 is a piston 60 having a stem 60a which abuts a lug 61 formed with an outer end of the pivoted yoke 57. Pressure fluid is supplied to the cylinder by means of piping 62 extending from a control valve 63 and including a flexible hose 62a interposed between the rigid portion of the piping and the ported head 64 over the cylinder 58. The control valve 63 includes a casing 65 having a rotary valve 66 which is operable by a handle 67. In one position, the rotary valve 66 admits pressure fluid from the intake port 68 into the piping 62, thereby moving the piston 58 to the position shown in Figure 6. Such movement of the piston causes the yoke 57 to move the clutch member 56 so that the pins 55 thereof disengage the recesses 54 of the gear 50, permitting this gear to idle about the shaft 51 so that it will no longer transmit power thereto for driving the conveyor screw 40.

Upon movement of the handle 67 to a position as shown by the dot and dash lines in Figure 6, the rotary valve 66 cuts off the intake port 68 and connects the piping 62 with the exhaust port 69, whereby the pressure fluid within the piping and cylinder 58 is exhausted to atmosphere. In the absence of pressure against the outer end of the piston 60, the spring 70, which has been compressed by the clutch member 56 in its rearward movement, will re-engage the pins 55 with the recesses 54 of the gear 50, whereupon normal operation of the conveyor screw 40 will be resumed.

It will be understood that the control valve is operated as above described when, because of foreign material becoming lodged between the flights of the conveyor screw 40 and the teeth 9 of the crusher 8 which arches over the screw, or for other reason, the conveyor screw 40 becomes stalled. When this occurs, the entire conveying system will stop; the fireman then disconnects the conveyor screw 40 from its operative relation with the gear train 41 by placing the handle 67 in the position as shown in Figure 6. Thus the screws 35 and 22 will continue to feed fuel into the firebox and usually the amount of fuel contained within the tubular extension 32 and the inclined conduit is sufficient in volume, which would permit the fireman to continue with his duties.

If the clog is of a nature which cannot be removed, fuel may be manually supplied into the laterally flared mouth 33 of the tubular extension 32 through an opening in the apertured floor which is formed by moving the slidable plates 20 to a position as shown in Figures 1 and 7 and also by removing the lower portion 80 of the coal gate 81. It will be observed from Figures 1 and 7 that the aperture 17 in the floor 16 extends slightly forward beyond the coal gate 81, which itself is formed, together with the lower portion 80 thereof, to insure that all of the fuel in the bin 18 normally passes through the crusher 8.

The crusher 8 is disposed within the trough 19 in such a manner so that space is provided between that side thereof remote from the teeth 9 and the forwardmost edge of the open mouth of the trough. Should a clog occur when fuel is being fed into the trough 19 from a zone adjacent the coal gate 81, the conveyor screw 40 is disconnected from the gear train in the manner which has been heretofore explained, and the lower portion 80 of the coal gate 81 removed whereby the fuel in the bin falls through the apertured floor 16 and into the tubular extension 32 wherein the conveyor screw 35 carries the fuel forwardly.

From the foregoing, it will be apparent that the improvements according to my invention provide, in a stoker having a movable conduit on the tender, a means for independently operating the pair of screws in such conduit, and the construction of the improved stoker is such that it can be readily applied to existing locomotives and meet the requirements of service under all conditions of locomotive operation.

I claim:

1. In a locomotive having a firebox and a tender for said locomotive, said tender including an apertured floor with a fuel bin thereabove, a stoker for transferring fuel from the bin to the firebox comprising a conduit mounted on the locomotive, a second conduit flexibly related to said first named conduit and movably mounted on said tender, said second named conduit including an upwardly opened portion arranged to receive fuel from the fuel bin through the apertured floor thereof, means in the second named conduit for urging fuel therethrough to said first named conduit including a pair of conveyor screws, one of said conveyor screws being disposed in the upwardly opened portion of said second named conduit, means cooperating with such conveyor screw for crushing lumps of fuel, said means being disposed in the upwardly opened portion of the second named conduit and being spaced rearward of the transverse vertical plane passed through the foremost edge of the aperture in said tender floor, a sealing ring between the open mouth portion of the second named conduit and the aperture in said tender floor for preventing escape of fuel through said aperture exteriorly of the second named conduit, the other of said conveyor screws extending forwardly from the first named conveyor screw and having its rearward end capable of receiving fuel manually through the aperture in said tender floor, and means for operating the second named conveyor screw independently of the first named conveyor screw.

2. In combination with a locomotive having a firebox and a tender for said locomotive, said tender including an apertured floor with a fuel bin thereabove, a stoker for transferring fuel from the bin to the firebox comprising a conduit mounted on the locomotive, a second conduit flexibly related to said first named conduit and movably mounted on said tender to receive fuel from the fuel bin through the apertured floor thereof, means in the second named conduit for urging fuel therethrough to said first named conduit including a pair of conveyor screws, the forward end of one conveyor screw being offset and separated from the rearward end of the other and arranged to deliver fuel to the rearward end of such conveyor screw, a gear train carried by the second named conduit for transmitting power to said conveyor screws, the rearward end of each of said conveyor screws being operatively related with said gear train, a clutch device carried by the second named conduit and being operative for disconnecting one of said conveyor screws from its operative relation with said gear train, and pressure fluid operated means for operating said clutch device.

3. In combination with a locomotive having a firebox and a tender for said locomotive, said tender including a centrally apertured floor with a fuel bin thereabove, a stoker for transferring fuel from the bin to the locomotive comprising a conduit mounted on the locomotive, a second conduit flexibly related with said first named conduit and movably mounted on said tender centrally of said fuel bin, said movably mounted conduit including an open mouth trough portion underlying the centrally apertured floor of said fuel bin, and a conveyor screw in said open mouth trough portion arranged with the forward end thereof at one side of the vertical medial plane of said tender.

4. In combination with a locomotive having a firebox and a tender for said locomotive, said tender including an apertured floor with a fuel bin thereabove, a stoker for transferring fuel from the bin to the locomotive comprising a conduit mounted on the locomotive, a second conduit flexibly related with said first named conduit and movably mounted on said tender, said movably mounted conduit including an open mouth trough portion underlying the apertured floor of said fuel bin, and a conveyor screw in said open mouth trough portion arranged with the axis thereof extending diagonally of the aforesaid open mouth trough portion of the second named conduit.

5. In combination with a locomotive having a firebox and a tender for said locomotive, said tender including an apertured floor with a fuel bin thereabove, a stoker for transferring fuel from the bin to the locomotive comprising a conduit mounted on the locomotive and delivering to said firebox, a second conduit flexibly related with the first named conduit and movably mounted on the tender, a conveyor in said second named conduit, conveying means arranged to receive fuel from the conveyor in said second named conduit and urge the fuel through the first named conduit, a gear train carried by said movable conduit, said conveyor and said conveying means being operatively related with said gear train, a clutch device carried by said movable conduit and being operative for disconnecting said conveyor from its operative relation with said gear train, and pressure fluid means for operating said clutch device.

6. In combination with a locomotive having a firebox and a tender for said locomotive, said tender including an apertured floor with a fuel bin thereabove, a stoker for transferring fuel from the bin to the locomotive comprising a conduit mounted on the locomotive and delivering to said firebox, a second conduit flexibly related with the first named conduit and movably mounted on the tender, a conveyor in said second named conduit, conveying means arranged to receive fuel from the conveyor in said second named conduit and urge the fuel through the first named conduit, a gear train carried by said movable conduit, said conveyor and said conveying means being operatively related with said gear train, a clutch device carried by said movable conduit and being operative for disconnecting said conveyor from its operative relation with said gear train, and pressure fluid means for operating said clutch device, said pressure fluid means including a piston and a cylinder carried by said movable conduit.

7. In combination with a locomotive having a firebox and a tender for said locomotive, said tender including an apertured floor with a fuel bin thereabove, a stoker for transferring fuel from the bin to the locomotive comprising a conduit mounted on the locomotive and delivering to said firebox, a second conduit flexibly related with the first named conduit and movably mounted on the tender, a conveyor in said second named conduit, conveying means arranged to receive fuel from the conveyor in said second named conduit and urge the fuel through the first named conduit, a gear train carried by said movable conduit, said conveyor and said conveying means being operatively related with said gear train, a clutch device carried by said movable conduit and being operative for disconnecting said conveyor from its operative relation with said gear train, and pressure fluid means for operating said clutch device, said pressure fluid means including a piston and a cylinder carried by said movable conduit, a control valve, and piping between said control valve and said cylinder, said piping including a flexible portion.

8. A locomotive stoker conduit arranged to be movably mounted on the tender including an open mouth trough portion and a tubular extension rigidly formed with the forward end of said trough portion, a conveyor screw in said open mouth trough portion and a conveyor screw in said tubular extension, the adjacent ends of said screws being laterally offset and separated from each other, the rearward ends of said conveyor screws having separate drive connections.

9. A locomotive stoker conduit arranged to be movably mounted on the tender including an open mouth trough portion and a tubular extension rigidly formed with the forward end of said trough portion, a conveyor screw in said open mouth trough portion and a conveyor screw in said tubular extension, the adjacent ends of said screws being laterally offset and separated from each other, a gear train carried by said conduit, the rearward ends of said conveyor screws being operatively connected with said gear train for independent operation.

10. In combination with a locomotive tender having a floor with a coal bin thereabove and a coal gate crossing the forward end of the bin, said floor being provided with an aperture extending forwardly beyond said coal gate, a stoker conduit beneath the floor and having a trough provided with an upwardly opening mouth beneath the aperture in said floor and extending forwardly beyond such aperture, and conveying means in said stoker conduit arranged to receive coal from said bin through the aperture in the floor thereof.

11. In combination with a locomotive tender having a floor with a coal bin thereabove and a coal gate crossing the forward end of the bin, said floor being provided with an aperture extending forwardly beyond said coal gate, a stoker conduit beneath the floor and having a trough provided with an upwardly opening mouth beneath the aperture in said floor and extending forwardly beyond such aperture, conveying means in said stoker trough arranged to receive coal from said bin through the aperture in the floor thereof, and a coal crusher coacting with said conveying means for reducing lumps of coal, said coal crusher being disposed within said trough portion to provide a space between one side thereof and the forwardmost edge of the open mouth portion of said trough.

12. In combination with an intercoupled locomotive and tender, a stoker for delivering fuel from said tender to said locomotive comprising a conduit movably mounted on the tender and flexibly supported at its forward end on the locomotive, a conveyor in said conduit, a power actuated shaft carried by said movable conduit normally having an operative connection with said conveyor, a clutch device carried by said movable conduit and being operative for disconnecting said conveyor from its operative relation with said power actuated shaft, and pressure fluid means for operating said clutch device.

CHARLES J. SURDY.